（12）United States Patent
Chu

(10) Patent No.: US 11,639,146 B2
(45) Date of Patent: May 2, 2023

(54) VEHICLE AND METHOD OF CONTROLLING THE SAME, AND AIRBAG CONTROL DEVICE

(71) Applicants: HYUNDAI MOTOR COMPANY, Seoul (KR); KIA MOTORS CORPORATION, Seoul (KR)

(72) Inventor: Sanguk Chu, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 288 days.

(21) Appl. No.: 17/028,168

(22) Filed: Sep. 22, 2020

(65) Prior Publication Data

US 2021/0179000 A1 Jun. 17, 2021

(30) Foreign Application Priority Data

Dec. 13, 2019 (KR) ........................ 10-2019-0166322

(51) Int. Cl.
*B60R 21/017* (2006.01)
*B60R 16/033* (2006.01)

(52) U.S. Cl.
CPC .......... *B60R 21/017* (2013.01); *B60R 16/033* (2013.01)

(58) Field of Classification Search
CPC ..... B60R 21/017; B60R 16/033; B60R 21/16; B60R 16/005
See application file for complete search history.

(56) References Cited

U.S. PATENT DOCUMENTS

| 6,731,023 | B2* | 5/2004 | Rothleitner | H02J 9/061 |
| | | | | 307/64 |
| 9,174,547 | B2* | 11/2015 | Oh | H02J 7/04 |
| 2008/0122614 | A1* | 5/2008 | Sakai | G08B 25/016 |
| | | | | 340/539.18 |
| 2016/0272042 | A1* | 9/2016 | Jensen | B60H 1/00778 |

FOREIGN PATENT DOCUMENTS

| JP | H0796815 A | * | 1/1995 | |
| KR | 1800727 B1 | * | 11/2017 | .......... B60R 11/0211 |
| KR | 20180004481 A | * | 2/2018 | ............. B60R 21/16 |

* cited by examiner

*Primary Examiner* — Marthe Y Marc-Coleman
(74) *Attorney, Agent, or Firm* — Morgan, Lewis & Bockius LLP

(57) ABSTRACT

A vehicle includes a first battery; a power distribution device configured to provide an IGN power source and a BAT power source from the first battery; a second battery; an airbag; and an airbag control device configured to receive power from the IGN power source of the power distribution device, and to deploy the airbag. The airbag control device may be configured to receive power from the BAT power source of the power distribution device when the vehicle is turned off, and to receive power from the second battery when the battery is damaged.

13 Claims, 7 Drawing Sheets

FIG. 6

| DIVISION | | FIRST EMERGENCY MODE | SECOND EMERGENCY MODE |
|---|---|---|---|
| ENTRY CONDITIONS | EVENT TRIGGER DURING PARKING | X | OFF |
| | IGN WHILE DRIVING | OFF | OFF |
| ACU POWER SOURCE | BAT POWER SOURCE | O | X |
| | SECONDARY BATTERY POWER | X | O |
| CONTROL | SECONDARY BATTERY CONTROL | OFF | ON |

VEHICLE AND METHOD OF CONTROLLING THE SAME, AND AIRBAG CONTROL DEVICE

CROSS-REFERENCE TO RELATED APPLICATION(S)

The present application is based on and claims the benefit of priority to Korean Patent Application No. 10-2019-0166322, filed on Dec. 13, 2019 in the Korean Intellectual Property Office, the disclosure of which is incorporated by reference in its entirety.

TECHNICAL FIELD

The disclosure relates to a vehicle, a method of controlling the same, and an airbag control device, and more particularly, to a vehicle including an airbag, a method of controlling the same, and an airbag control device.

BACKGROUND

In general, a vehicle refers to a movement device or transportation device that is designed to drive on a road or railway using fossil fuel, electric power, and the like as a motive power source. For example, the vehicle may drive using motive power generated by an engine.

The vehicle is boarded by people, such as drivers and passengers. Therefore, the vehicle is designed with priority on the safety of the person, such as the drivers and passengers, among other things.

In particular, the vehicle includes an airbag to protect the life of the drivers and passengers in an event of a collision. The airbag may be electrically controlled by an airbag control device (ACU: airbag control unit).

The airbag control device is an electrical device and does not operate unless power is supplied. For example, even if the airbag is deployed due to a serious primary impact of the vehicle, the power supply of the airbag control device may be cut off. Thereafter, when a serious secondary impact occurs in the vehicle, the airbag may not be deployed due to the airbag control device not operating.

The information disclosed in the Background section above is to aid in the understanding of the background of the present disclosure, and should not be taken as acknowledgement that this information forms any part of prior art.

SUMMARY

An aspect of the disclosure is to provide a vehicle capable of deploying an airbag even after impact on the vehicle.

Additional aspects of the disclosure will be set forth in part in the description which follows and, in part, will be obvious from the description, or may be learned by practice of the disclosure.

In accordance with an aspect of the disclosure, a vehicle includes a first battery; a power distribution device configured to provide an IGN power source and a BAT power source from the first battery; a second battery; an airbag; and an airbag control device configured to receive power from the IGN power source of the power distribution device, and to deploy the airbag. The airbag control device may be further configured to receive power from the BAT power source of the power distribution device when the vehicle is turned off, and to receive power from the second battery when the battery is damaged.

The airbag control device may include a power circuit configured to receive power from at least one of the IGN power source, the BAT power source, and the second battery; or a controller configured to receive power from the second battery based on a voltage of the IGN power source and a voltage of the BAT power source.

The controller may be further configured to receive power from the second battery when both the voltage of the IGN power source and the voltage of the BAT power source are less than a predetermined reference voltage.

The airbag control device may further include a first switch provided between the second battery and the power circuit. The controller may be further configured to turn on the first switch to receive power from the second battery.

The airbag control device may further include an emergency capacitor connected to the controller. The controller may be further configured to receive power from the emergency capacitor based on the voltage of the second battery.

The controller may be further configured to receive power from the emergency capacitor when the voltage of the second battery is less than the predetermined reference voltage.

The airbag control device may further include a second switch arranged between the emergency capacitor and the controller. The controller may be further configured to turn on the second switch to receive power from the emergency capacitor.

The first battery and the power distribution device are located in an engine room of the vehicle. The second battery is located in a cabin of the vehicle.

The vehicle may further include a driving image recording device. The second battery may be configured to supply power to the driving image recording device.

The second battery may be configured to be charged by the IGN power source.

In accordance with another aspect of the disclosure, in a method of controlling a vehicle, the vehicle includes a first battery, a power distribution device configured to provide an IGN power source and a BAT power source from the first battery, a second battery, and an airbag. The method includes receiving power from at least one of the IGN power source of the power distribution device, the BAT power source of the power distribution device, or the second battery; and receiving power from the second battery based on a voltage of the IGN power source and a voltage of the BAT power source.

The receiving of power from the second battery may include receiving power from the second battery when both the voltage of the IGN power source and the voltage of the BAT power source are less than a predetermined reference voltage.

The method may further include receiving power from an emergency capacitor based on the voltage of the second battery.

The receiving of power from the emergency capacitor may include receiving power from the emergency capacitor when the voltage of the second battery is less than the predetermined reference voltage.

In accordance with another aspect of the disclosure, in an airbag control device provided in a vehicle including a first battery, a power distribution device configured to provide an IGN power source and a BAT power source from the first battery, a second battery, and an airbag, the airbag control device includes a power circuit configured to receive power from at least one of the IGN power source of the power distribution device, the BAT power source of the power distribution device, or the second battery; and a controller configured to configured to receive power from the IGN power source to deploy the airbag, and to receive power from the second battery based on a voltage of the IGN power source and a voltage of the BAT power source.

The controller may be further configured to receive power from the second battery when both the voltage of the IGN power source and the voltage of the BAT power source are less than a predetermined reference voltage.

The airbag control device may further include a first switch arranged between the second battery and the power circuit. The controller may be further configured to turn on the first switch to receive power from the second battery.

The airbag control device may further include an emergency capacitor connected to the controller. The controller may be further configured to receive power from the emergency capacitor based on the voltage of the second battery.

The controller may be further configured to receive power from the emergency capacitor when the voltage of the second battery is less than the predetermined reference voltage.

The airbag control device may further include a second switch arranged between the emergency capacitor and the controller. The controller may be further configured to turn on the second switch to receive power from the emergency capacitor.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a view illustrating an operation mode of an airbag control device included in a vehicle according to an exemplary embodiment of the present disclosure.

DETAILED DESCRIPTION

Figure 1:
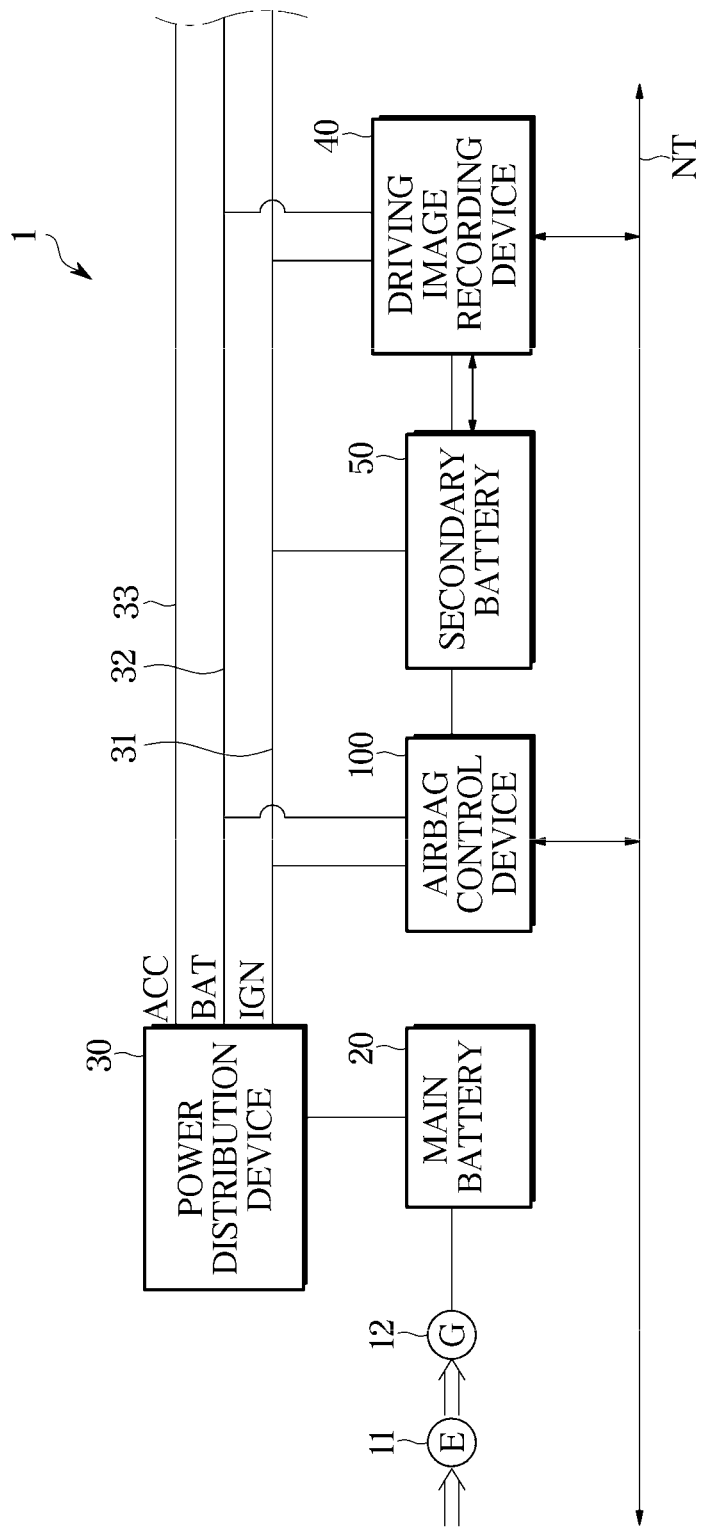
FIG. 1 is a view illustrating a power supply of a vehicle according to an exemplary embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the operation principles and embodiments of the disclosure will be described with reference to accompanying drawings.

Figure 2:
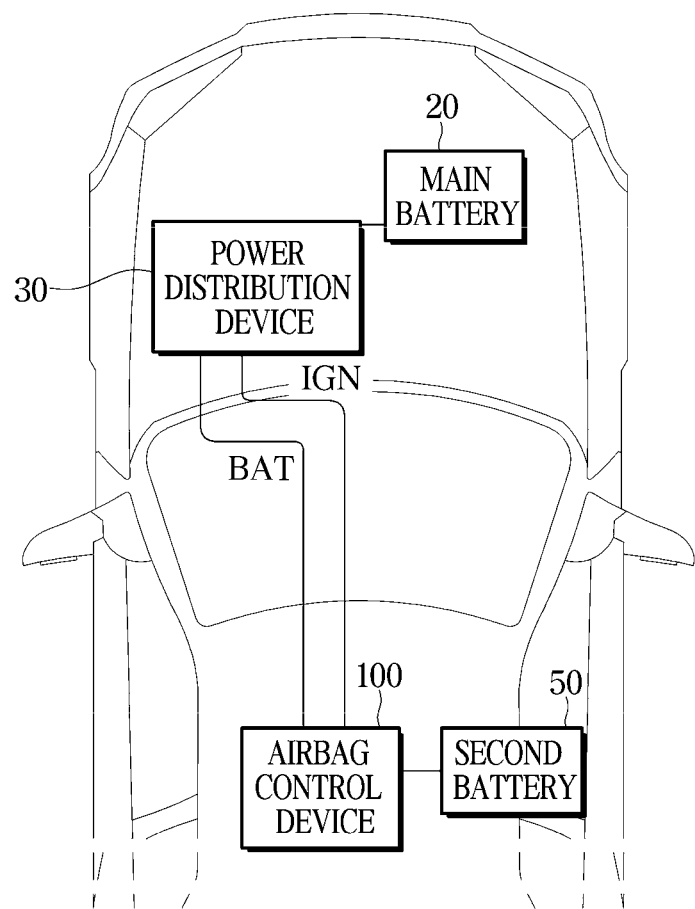
FIG. 2 is a view illustrating a simplified arrangement of components of a vehicle according to an exemplary embodiment of the present disclosure.

FIG. 1 is a view illustrating a power supply of a vehicle according to an exemplary embodiment of the present disclosure, and FIG. 2 is a view illustrating a simplified arrangement of components of a vehicle according to an exemplary embodiment of the present disclosure.

A vehicle 1 may include a body that forms the external appearance thereof and accommodates a driver and/or luggage, a chassis that includes components of the vehicle 1 except for the body, and electrical devices that protect the driver and provide convenience to the driver.

Referring to FIG. 1, the vehicle 1 may include 1 may include an engine 11, a generator 12, a first battery 20, a power distribution device (e.g., an electrical Junction Box) 30, a driving image recording device 40, and a second battery 50, and an airbag control device 100. Such electrical devices may communicate with each other through a vehicle communication network NT. For example, the electrical devices may transmit and receive data through Ethernet, media oriented systems transport (MOST), Flexray, controller area network (CAN), local Interconnect Network (LIN), and the like.

The engine 11 may generate motive power using explosive combustion of fuel, and the motive power of the engine 11 may be transmitted to wheels. In this case, a portion of rotary power generated by the engine 11 may be provided to the generator 12, and the generator 12 may produce electric power (hereinafter, referred to as 'power') from the motive power of the engine 11. A portion of the power produced by the generator 12 may be supplied to the electrical devices of the vehicle 1, and another portion of the power may be stored in the first battery 20 of the vehicle 1.

The generator 12 may produce electrical energy, that is, the power, from a rotational force of the engine 11. The generator 12 may include a rotor that rotates with a rotation axis of the engine 11 and a stator fixed to the body. The rotor may rotate with the rotation axis of the engine 11 and may generate a rotating magnetic field. The stator may include a stator coil, and a current is induced in the stator coil by a rotating magnetic field of the rotor. By the current induced in the stator coil, the generator 12 may supply the current to the first battery 20. In other words, the generator 12 may provide electrical energy to the first battery 20.

The first battery 20 may store electrical energy generated from the motive power of the engine 11 and provide the electrical energy to the electrical devices of the vehicle 1. During driving of the vehicle 1, the generator 12 may convert rotational energy of the engine 11 into electrical energy, and the first battery 20 may receive the electrical energy from the generator 12 and store the electrical energy. When the power consumed by the electrical devices of the vehicle 1 during driving of the vehicle 1 is greater than the power produced by the generator 12, the first battery 20 may supply power to the electrical devices of the vehicle 12. Also, the first battery 20 may supply power to the electrical devices of the vehicle 1 in a parked state of the vehicle in which the engine 11 is stopped.

The first battery 20 may include a battery sensor. The battery sensor may detect the output (output voltage, output current, etc.) of the first battery 20. The battery sensor may generate battery data based on the output voltage of the first battery 20, the output current of the first battery 20, and the temperature of the first battery 20. For example, the battery sensor may determine a state of charge (SoC) of the first battery 20 based on the output voltage of the first battery 20, the output current of the first battery 20, and the temperature of the first battery 20. The SoC of the first battery 20 may indicate a level at which electrical energy is stored in the first battery 20. The SoC generally has a value of 0% to 100%, and indicates the degree to which the first battery 20 is charged between a full discharge state (0%) and a full charge state (100%).

The power distribution device 30 may distribute/supply power from the generator 12 and/or the first battery 20 to the electrical devices. For example, the power distribution device 30 may allow or cut off power supply from the generator 12 and/or the first battery 20 to the electrical devices.

The power distribution device 30 may provide different types of power according to a starting state of the vehicle 1.

For example, the power distribution device 30 may provide an IGN power source 31, a BAT power source 32, and an ACC power source 33. The BAT power source 32, the IGN power source 31, and the ACC power source 33 may be supplied through different wires.

The term "IGN" is a short for "ignition" and the term "BAT" is a short for "battery".

The BAT power source 32 may be a power supply to which power is always supplied from the first battery 20. The electrical devices connected to the BAT power source 32 may always receive power from the first battery 20 unless the first battery 20 is completely discharged.

The IGN power source 31 is a power source supplied with power from the first battery 20 in a state where the vehicle 1 is started. When a key of the vehicle 1 is located in an "ON" position in a state of being inserted into a key hole, an ignition of the vehicle 1 is turned on and the IGN power source 31 may be activated. In addition, in a case of an electronic key, when an ignition button of the vehicle 1 is pressed while the vehicle 1 is braked (the driver presses a brake pedal), the ignition of the vehicle 1 is turned on and the IGN power source 31 may be activated.

The electrical devices connected to the IGN power source 31 may receive power from the first battery 20 only when the ignition of the vehicle 1 is turned on, and do not receive power from the first battery 20 when the ignition of the vehicle 1 is not turned on.

The ACC power source 33 is a power source capable of supplying power to the electrical devices of the vehicle 1 in a state in which the ignition of the vehicle 1 is not turned on. When the key of the vehicle 1 is located in the "ACC" with the key hole inserted, the ACC power source 33 may be activated while the ignition of the vehicle 1 is not turned on. Further, in the case of the electronic key, when the ignition button of the vehicle 1 is pressed in a state in which the vehicle 1 is not braked (a state in which the driver does not press the brake pedal), the ACC power source 33 may be activated when the ignition of the vehicle 1 is not turned on.

The electrical devices connected to the IGN power source 31 may receive power from the first battery 20 while the key of the vehicle 1 is located at "ACC".

The driving image recording device 40 may capture the front and/or rear of the vehicle 1 and store the captured image data. The driving image recording device 40 may include, for example, a camera for capturing the front and/or rear of the vehicle 1 and obtaining image data, a processor for processing the image data, a memory for storing the processed image data, and the like.

The driving image recording device 40 may be used as evidence of an incident/accident related to the vehicle 1. The driving image recording device 40 may record an accident image generated while the vehicle 1 is driving, and may also record an accident image generated while the vehicle 1 is parked. Therefore, the driving image recording device 40 may not only capture the front and/or rear of the vehicle 1 while the vehicle 1 is driving, but also the front and/or rear of the vehicle 1 while the vehicle 1 is parked.

As described above, the driving image recording device 40 may be required to be supplied with the power in the state in which the ignition of the vehicle 1 is turned on as well as in the state in which the ignition of the vehicle 1 is turned off.

However, when the driving image recording device 40 is supplied with power from the BAT power source 32, the first battery 20 may be completely discharged while the ignition of the vehicle 1 is turned off. As described above, since the driving image recording device 40 operates even when the ignition of the vehicle 1 is turned off, when the vehicle 1 is parked for a long time, the power consumption of the driving image recording device 40 increases, and the first battery 20 may be completely discharged.

In order to prevent the discharge of the first battery 20, the driving image recording device 40 may receive power from the IGN power source 31 and/or the BAT power source 32 while the ignition of the vehicle 1 is turned on, and may receive power from the second battery 50 provided separately from the first battery 20 while the ignition of the vehicle 1 is turned off.

The second battery 50 may store electrical energy provided from the first battery 20 and/or the generator 12, and provide electrical energy to the driving image recording device 40. The second battery 50 may be charged by receiving power from the first battery 20 while the ignition of the vehicle 1 is turned on, and the second battery 50 may not be charged while the ignition of the vehicle 1 is turned off and may supply power to the driving image recording device 40.

The airbag control device 100 may deploy the airbag that can protect the driver from impact when the vehicle 1 collides with an obstacle. The airbag control device 100 may receive a signal indicating the collision with the obstacle from a collision sensor, and induce a chemical reaction of a fuse composed of sodium azide in response to the collision signal. Nitrogen is generated by the chemical reaction of sodium azide, and the airbag may be deployed.

The airbag control device 100 may receive power from the IGN power source 31.

The IGN power source 31 may be supplied only when the ignition of the vehicle 1 is turned on, and the ignition of the vehicle 1 may be turned off when the vehicle 1 collides with the obstacle. As such, when the ignition of the vehicle 1 is turned off, the IGN power source 31 may be deactivated. When the airbag control device 100 is supplied with power only from the IGN power source 31, the airbag control device 100 may not operate and the airbag may not be deployed due to the deactivation of the IGN power source 31.

In order to prevent unfolding of the airbag due to the deactivation of the IGN power source 31, the airbag control device 100 may receive power from the IGN power source 31 as well as the BAT power source 32. In other words, when the IGN power source 31 is deactivated, the airbag control device 100 may receive power from the BAT power source 32.

As illustrated in FIG. 2, the first battery 20 and the power distribution device 30 are generally located in front of the vehicle 1. Particularly, the first battery 20 and the power distribution device 30 may be disposed in an engine room of the vehicle 1.

Because the first battery 20 and the power distribution device 30 are disposed in the engine room of the vehicle 1, there is a risk of damage to the first battery 20 or the power distribution device 30 in the event of a front collision of the vehicle 1.

When the first battery 20 or the power distribution device 30 is damaged, not only the IGN power source 31 but also the BAT power source 32 are deactivated. If the airbag control device 100 receives power only from the IGN power source 31 and the BAT power source 32, the airbag control device 100 does not operate may not operate and the airbag may not be deployed due to the deactivation of the IGN power source 31 and the BAT power source 32.

In order to prevent unfolding of the airbag due to the deactivation of the IGN power source 31 and the BAT power source 32, the airbag control device 100 may receive power from the IGN power source 31 and the BAT power source 32 as well as the second battery 50.

As illustrated in FIG. 2, the second battery 50 may be located in a cabin of the vehicle 1 together with the driving image recording device 40. Therefore, even in the case of the front collision of the vehicle 1, the second battery 50 located in the cabin of the vehicle 1 is unlikely to be damaged. The probability that the second battery 50 is damaged is at least lower than the probability that the first battery 20 and the power distribution device 30 provided in the engine room are damaged.

When both the IGN power source 31 and the BAT power source 32 are deactivated, the airbag control device 100 may receive power from the second battery 50.

In addition, the airbag control device 100 may further include an emergency capacitor in preparation for damage to the second battery 50. When all of the IGN power source 31, the BAT power source 32, and the second battery 50 are deactivated, the airbag control device 100 may receive power from the emergency capacitor.

Hereinafter, the configuration and operation of the airbag control device 100 will be described in more detail.

Figure 3:
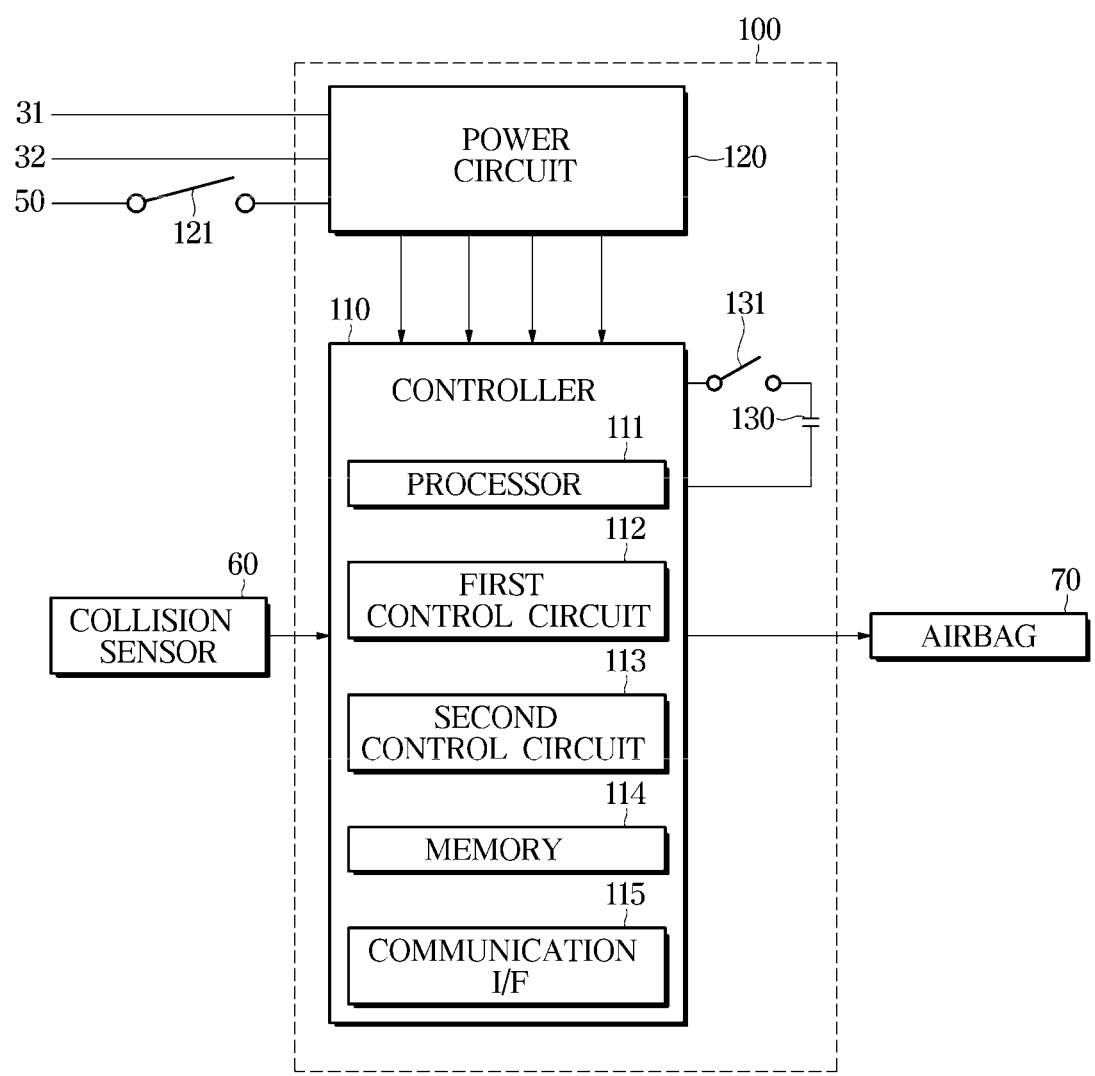
FIG. 3 is a view illustrating a configuration of an airbag control device included in a vehicle according to an exemplary embodiment of the present disclosure.
Figure 4:
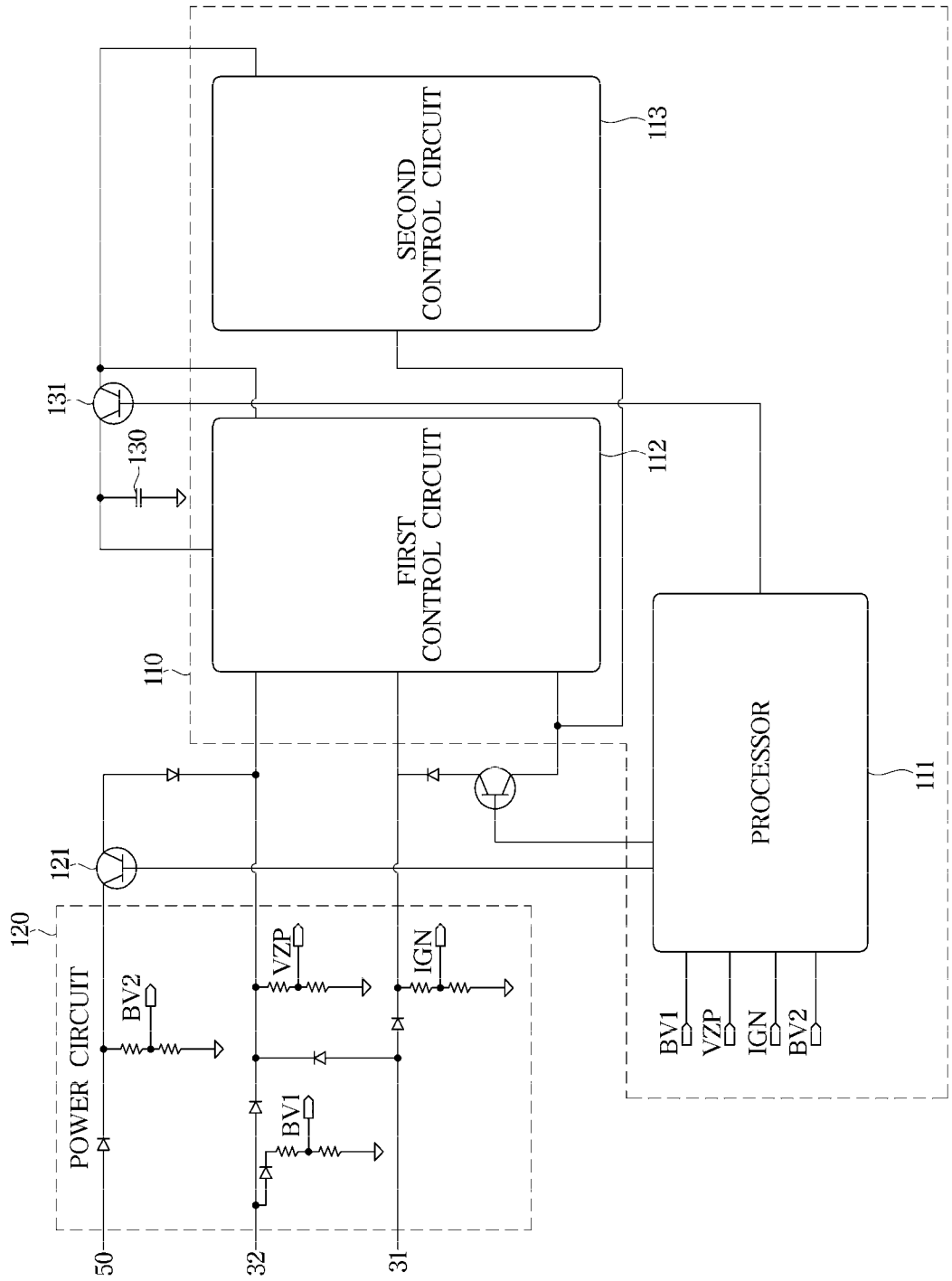
FIG. 4 is a circuit diagram of an airbag control device included in a vehicle according to an exemplary embodiment of the present disclosure.
Figure 5:
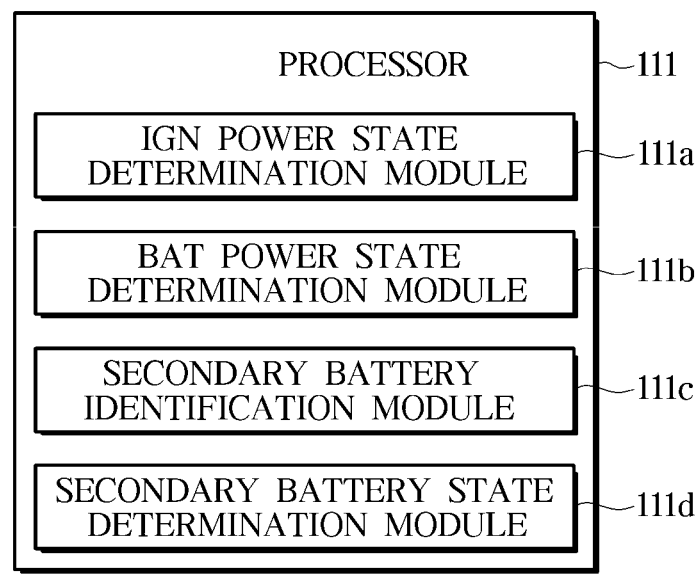
FIG. 5 is a view illustrating a function of a processor included in a vehicle according to an exemplary embodiment of the present disclosure.

FIG. 3 is a view illustrating a configuration of an airbag control device included in a vehicle according to an exemplary embodiment of the present disclosure, FIG. 4 is a circuit diagram of an airbag control device included in a vehicle according to an exemplary embodiment of the present disclosure, FIG. 5 is a view illustrating a function of a processor included in a vehicle according to an exemplary embodiment of the present disclosure, and FIG. 6 is a view illustrating an operation mode of an airbag control device included in a vehicle according to an exemplary embodiment of the present disclosure.

As illustrated in FIG. 3, the vehicle 1 may include a collision sensor 60, an airbag 70, and the airbag control device 100.

The collision sensor 60 may detect the collision between the obstacle and the vehicle 1. For example, the collision sensor 60 may include an acceleration sensor that measures an acceleration of the vehicle 1 due to the collision with the obstacle or a jerk sensor that measures a change in the acceleration of the vehicle 1 due to the collision with the obstacle. Alternatively, the collision sensor 60 may include a pressure sensor that detects a change in pressure due to the collision with the obstacle.

The collision sensor 60 may provide information about the collision with the obstacle (change in acceleration, acceleration, or pressure) to the airbag control device 100.

The airbag 70 is an air bag for protecting the driver from impact due to the collision when the vehicle 1 collides with the obstacle. When the obstacle collides with the vehicle 1, the chemical reaction occurs in the fuse composed of sodium azide by the control of the airbag control device 100, and nitrogen is injected into the airbag 70. The nitrogen-filled airbag 70 may prevent the driver from directly colliding with the body.

The airbag control device 100 may deploy the airbag 70 in response to an output signal of the collision sensor 60. For example, the airbag control device 100 may determine whether to deploy the airbag 70 based on an acceleration change output from the collision sensor 60, and may deploy the airbag 70 in response to the acceleration change being greater than or equal to a reference value.

The airbag control device 100 may include a power circuit 120, an emergency capacitor 130, and a controller 110.

The power circuit 120 may receive power from the IGN power source 31, the BAT power source 32, the second battery 50, or the emergency capacitor 130, and may supply the received power to components included in the airbag control device 100 (e.g., a collision sensor, an airbag driving unit, a communication interface, a storage, and a controller).

For example, the power circuit 120 may include a plurality of resistors and a plurality of diodes to protect the circuit from overcurrent, as illustrated in FIG. 2. The BAT power source 32 and the IGN power source 31 are integrally connected to first and second control circuits 112 and 113, and the second battery 50 may be connected to the first and second control circuits 112 and 113 through the first switch 121. The power applied to a high voltage among the BAT power source 32 and the IGN power source 31 may supply power to the airbag control device 100. When the first switch 121 is "on", the second battery 50 may supply power to the airbag control device 100.

The power circuit 120 may provide information BV1 about the voltage of the BAT power source 32, information IGN about the voltage of the IGN power source 31, information VZP about the voltage input to the airbag control device 100, and information BV2 about the voltage of the second battery 50 to the controller 110.

The emergency capacitor 130 may be charged by receiving power from the IGN power source 31 during the start-up of the vehicle 1. When the IGN power source 31 and the BAT power source 32 are deactivated and the second battery 50 is damaged, the emergency capacitor 130 may supply power to the components included in the airbag control device 100 for a short time.

The emergency capacitor 130 may be composed of a large-capacity capacitor such as a capacitor, and may be connected to the power circuit 120 through the second switch 131. The emergency capacitor 130 may supply power to the airbag control device 100 when the second switch 131 is "on".

The controller 110 may process the output signal of the collision sensor 60 and output a control signal for controlling the airbag 70. For example, the controller 110 may receive information about the acceleration change from the collision sensor 60 and determine the acceleration change. The controller 110 may compare the acceleration change with the reference value and output the control signal for deploying the airbag 70 in response to the acceleration change being greater than or equal to the reference value.

The controller 110 may include a communication interface 115, a memory 114, the first and second control circuits 112 and 113, and a processor 111.

The communication interface 115 may include a CAN transceiver that receives a communication signal from other electrical devices of the vehicle 1 through the vehicle communication network NT and transmits the communication signal to other electrical devices of the vehicle 1, a communication controller that controls an operation of the transceiver.

The can transceiver may receive information about the second battery 50 from the driving image recording device 40 through the vehicle communication network NT. For example, the can transceiver may receive identification information of the second battery 50 and the SoC of the second battery 50 from the driving image recording device 40.

As such, the airbag control device 100 may communicate with electrical devices such as the driving image recording device 40 through the communication interface 115.

The memory 114 may store control programs and/or control data for controlling the airbag control device 100.

The memory 114 may provide programs and/or data to the processor 111 according to a memory control signal of the processor 111. For example, the memory 114 may temporarily store communication data received through the communication interface 115.

The memory 114 may include volatile memories, such as a static random access memory (S-RAM), a dynamic random access memory (D-RAM), and non-volatile memories, such as a read-only memory (ROM), an erasable programmable read-only memory (EPROM), an Electrically Erasable Programmable Read Only Memory (EEPROM), and the like.

In addition, the memory 114 may include a semiconductor device drive (SSD: Solid Stat Drive), a magnetic disc drive (HDD: Hard Disc Drive), and the like, and may store various data for controlling the deployment of the airbag 70.

The processor 111 and the first/second control circuits 112 and 113 may generate the control signal according to execute programs and control data stored in the memory 114.

The first control circuit 112 may process data according to the programs provided from the memory 114 and generate the control signal according to the processing result.

The first control circuit 112 may process the acceleration change received from the collision sensor 60 and may generate the control circuit for controlling the airbag 70 according to the acceleration change. For example, the first control circuit 112 may compare the acceleration change with the reference value and generate the control signal for deploying the airbag 70 in response to the acceleration change being greater than or equal to the reference value.

The second control circuit 113 may provide redundancy for the first control circuit 112. In other words, the second control circuit 113 may be a backup circuit of the first control circuit 112 and may perform the function of the first control circuit 112 when the first control circuit 112 fails or stops.

The processor 111 may process data according to the program provided from memory 114, and generate the control signal according to the processing result. The processor 111 may include various logic circuits and operation circuits.

The processor 111 may receive information BV1 about the voltage of the BAT power source 32, information IGN about the voltage of the IGN power source 31, information VZP about the voltage input to the airbag control device 100, and information BV2 about the voltage of the second battery 50 from the power circuit 120, and may determine the states of the BAT power source 32, the IGN power source 31, and the second battery 50 based on the received information BV1, IGN, VZP, and BV2.

As illustrated in FIG. 5, the processor 111 may include an IGN power state determination module 111A, a BAT power state determination module 111B, a second battery identification module 111C, and a second battery state determination module 111D. The IGN power state determination module 111A, the BAT power state determination module 111B, the second battery identification module 111C, and the second battery state determination module 111D may be a program stored in the processor 111 or a logic circuit mounted in the processor 111.

The IGN power state determination module 111A may determine the voltage of the IGN power source 31 based on the information IGN about the voltage of the IGN power source 31, and determine whether the IGN power source 31 is deactivated based on the voltage of the IGN power source 31. For example, when the voltage of the IGN power source 31 is 8V or more and 16V or less, the IGN power state determination module 111A may determine the normality of the IGN power source 31. When the voltage of the IGN power source 31 is less than 8V, the IGN power state determination module 111A may determine the deactivation of the IGN power source 31.

The BAT power state determination module 111B may determine the voltage of the BAT power source 32 based on the information BV1 about the voltage of the BAT power source 32, and determine whether the BAT power source 32 is deactivated based on the voltage of the BAT power source 32. For example, when the voltage of the BAT power source 32 is 8V or more and 16V or less, the BAT power state determination module 111B may determine the normality of the BAT power source 32. When the voltage of the BAT power source 32 is less than 8V, the BAT power state determination module 111B may determine the deactivation of the BAT power source 32.

The second battery identification module 111C may identify the second battery 50 based on information about the second battery 50 received from the driving image recording device 40 through the communication interface 115.

The second battery state determination module 111D may determine the output voltage of the second battery 50 based on information BV2 about the voltage of the second battery 50 and information about the second battery 50 received through the communication interface 115. In addition, the second battery state determination module 111D may determine whether the second battery 50 is damaged based on the voltage of the BAT power source 32. For example, when the voltage of the second battery 50 is 8V or more and 16V or less, the second battery state determination module 111D may determine the normality of the second battery 50. When the voltage of the second battery 50 is less than 8V, the second battery state determination module 111D may determine damage to the second battery 50.

Based on the deactivation of the IGN power source 31 and/or the BAT power source 32, the processor 111 may operate in a first emergency mode or a second emergency mode as illustrated in FIG. 6.

The processor 111 may operate in a normal mode while the IGN power source 31 is activated while driving.

In the normal mode, the processor 111 may turn off the first switch 121 to cut off the power of the second battery 50 and turn off the second switch 131 to cut off the power of the emergency capacitor 130. The airbag control device 100 may receive power from the power source having a larger voltage among the IGN power source 31 and the BAT power source 32.

The processor 111 may operate in the first emergency mode when the IGN power source 31 is deactivated due to the collision of the vehicle 1 while driving. Particularly, when the ignition of the vehicle 1 is turned off, the processor 111 may operate in the first emergency mode.

In the first emergency mode, the processor 111 may turn off the first and second switches 131 so that the power of the second battery 50 and the power of the emergency capacitor 130 are cut off. The airbag control device 100 may receive power from the BAT power source 32.

The processor 111 may operate in the second emergency mode when the IGN power source 31 is deactivated due to the collision of the vehicle 1 during driving or an event trigger occurs during parking. Particularly, when the first battery 20 of the vehicle 1 is damaged, the processor 111 may operate in the second emergency mode.

In the second emergency mode, the processor 111 may turn on the first switch 121 so that the power of the second battery 50 is supplied to the airbag control device 100. The airbag control device 100 may receive power from the second battery 50. In the second emergency mode, the airbag control device 100 may receive power from the second battery 50 for approximately 3 minutes.

Further, the processor 111 may operate in the second emergency mode when the speed change of the vehicle 1 is greater than or equal to a threshold value when the vehicle 1 collides. For example, the processor 111 may turn on the first switch 121 when the speed change of the vehicle 1 is 8 kph (Km/h) or more when the vehicle 1 collides. When the first switch 121 is turned on, the airbag control device 100 may receive power from the power source having a larger voltage among the IGN power source 31, the BAT power source 32, and the second battery 50.

In addition, when it is determined that the second battery 50 is damaged, the processor 111 may turn on the first switch 121 so that the power of the emergency capacitor 130 is supplied to the airbag control device 100. When the second switch 131 is turned on, the airbag control device 100 may receive power from the emergency capacitor 130 for approximately 150 ms.

Figure 7:
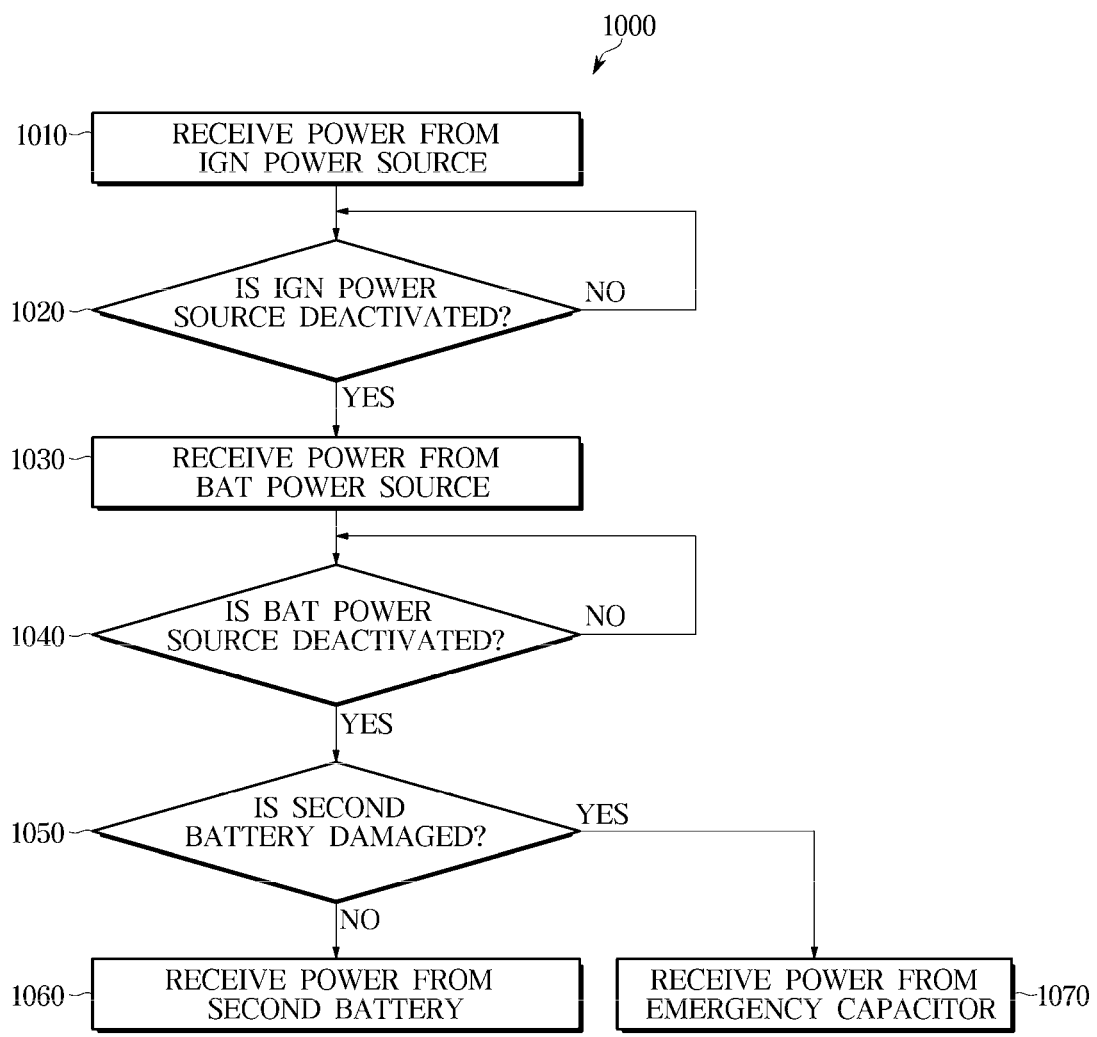
FIG. 7 is a view illustrating a power management operation of an airbag control device included in a vehicle according to an exemplary embodiment of the present disclosure.

FIG. 7 is a view illustrating a power management operation of an airbag control device included in a vehicle according to an exemplary embodiment of the present disclosure.

Referring to FIG. 7, the power management operation 1000 of the airbag control device 100 is described.

The airbag control device 100 may receive power from the IGN power source 31 (1010).

In the normal mode, the controller 110 may receive power from the IGN power source 31 and the BAT power source 32. Particularly, the controller 110 may receive power from the power source having the higher voltage among the IGN power source 31 and the BAT power source 32.

The airbag control device 100 may determine whether the IGN power source 31 is deactivated (1020).

When the vehicle 1 collides with the obstacle while driving, the ignition of the vehicle 1 may be turned off. When the ignition of the vehicle 1 is turned off, the IGN power source 31 may be deactivated.

While receiving power from the IGN power source 31, the controller 110 may detect the voltage of the IGN power source 31 and determine whether the IGN power source 31 is deactivated based on the voltage of the IGN power source 31. For example, when the voltage of the IGN power source 31 is 8V or more and 16V or less, the controller 110 may determine whether the IGN power source 31 is normal. When the voltage of the IGN power source 31 is less than 8V, the controller 110 may determine the deactivation of the IGN power source 31.

When the IGN power source 31 has not been deactivated (NO in 1020), the airbag control device 100 may continue to receive power from the IGN power source 31.

When the IGN power source 31 is deactivated (YES in 1020), the airbag control device 100 may receive power from the BAT power source 32 (1030).

When the IGN power source 31 is deactivated, the controller 110 may switch to the first emergency mode. In the first emergency mode, the controller 110 may receive power from the BAT power source 32.

The airbag control device 100 may determine whether the BAT power source 32 is deactivated (1040).

When the vehicle 1 collides with the obstacle while driving, the first battery 20 of the vehicle 1 may be damaged. When the first battery 20 of the vehicle 1 is damaged, the IGN power source 31 and the BAT power source 32 may be deactivated.

While receiving power from the BAT power source 32, the controller 110 may detect the voltage of the BAT power source 32 and determine whether the BAT power source 32 is deactivated based on the voltage of the BAT power source 32. For example, when the voltage of the BAT power source 32 is 8V or more and 16V or less, the controller 110 may determine whether the BAT power source 32 is normal. When the voltage of the BAT power source 32 is less than 8V, the controller 110 may determine the deactivation of the BAT power source 32.

When the BAT power source 32 has not been deactivated (NO in 1040), the airbag control device 100 may continue to receive power from the BAT power source 32.

When the BAT power source 32 is deactivated (YES in 1040), the airbag control device 100 may determine whether the second battery 50 is damaged (1050).

When the IGN power source 31 and the BAT power source 32 are deactivated, the controller 110 may switch to the second emergency mode. In the second emergency mode, the controller 110 may determine whether the second battery 50 is damaged.

When the vehicle 1 collides with the obstacle while driving, the first battery 20 of the vehicle las well as the second battery 50 of the vehicle 1 may be damaged. When both the first battery 20 and the second battery 50 of the vehicle 1 are damaged, the power of the IGN power source 31, the BAT power source 32, and the second battery 50 may all be deactivated.

The controller 110 may detect the voltage of the second battery 50 and determine whether the second battery 50 is damaged based on the voltage of the second battery 50. For example, when the voltage of the second battery 50 is 8V or more and 16V or less, the controller 110 may determine whether the second battery 50 is normal. When the voltage of the second battery 50 is less than 8V, the controller 110 may determine damage to the second battery 50.

When the second battery 50 is not damaged (NO in 1050), the airbag control device 100 may receive power from the second battery 50 (1060).

In order to receive power from the second battery 50 in the second emergency mode, the controller 110 may turn on the first switch 121. When the first switch 121 is turned on, the airbag control device 100 may receive power from the second battery 50.

The second battery 50 may be located in the cabin of the vehicle 1 together with the driving image recording device 40. Even in the event of the front collision of the vehicle 1, the possibility that the second battery 50 located in the cabin of the vehicle 1 is damaged is low. Therefore, the second battery 50 may supply power to the airbag control device 100 more stable than the first battery 20.

When the second battery 50 is damaged (YES in 1050), the airbag control device 100 may receive power from the emergency capacitor 130 (1070).

In order to receive power from the emergency capacitor 130 in the second emergency mode, the controller 110 may turn on the second switch 131. When the second switch 131 is turned on, the airbag control device 100 may receive power from the emergency capacitor 130 for the short time (e.g., 150 ms).

Since the emergency capacitor 130 is provided in the airbag control device 100, it is less likely to be damaged even in the event of the front collision of the vehicle 1. Therefore, the emergency capacitor 130 may stably supply power to the airbag control device 100 for the short time.

According to the embodiments of the disclosure, the vehicle may be capable of deploying an airbag even after impact on the vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
   a first battery;
   a power distribution device configured to provide an IGN power source and a BAT power source from the first battery;
   a second battery;
   an airbag; and
   an airbag control device configured to receive power from the IGN power source of the power distribution device, and to deploy the airbag,
   wherein the airbag control device is further configured to receive power from the BAT power source of the power distribution device when the vehicle is turned off, and to receive power from the second battery when the first battery is damaged, wherein the airbag control device comprises:
a power circuit configured to receive power from at least one of the IGN power source, the BAT power source, or the second battery;
a controller configured to receive power from the second battery based on a voltage of the IGN power source and a voltage of the BAT power source; and
an emergency capacitor connected to the controller, and
wherein the controller is configured to receive power from the emergency capacitor when a voltage of the second battery is less than a predetermined reference voltage.

2. The vehicle according to claim 1, wherein the controller is further configured to receive power from the second battery when both the voltage of the IGN power source and the voltage of the BAT power source are less than the predetermined reference voltage.

3. The vehicle according to claim 2, wherein:
the airbag control device further comprises a first switch arranged between the second battery and the power circuit, and
the controller is further configured to turn on the first switch to receive power from the second battery.

4. The vehicle according to claim 3, wherein:
the airbag control device further comprises a second switch arranged between the emergency capacitor and the controller, and
the controller is further configured to turn on the second switch to receive power from the emergency capacitor.

5. The vehicle according to claim 1, wherein:
the first battery and the power distribution device are located in an engine room of the vehicle, and
the second battery is located in a cabin of the vehicle.

6. The vehicle according to claim 1, wherein:
the vehicle further comprises a driving image recording device, and
the second battery is configured to supply power to the driving image recording device.

7. The vehicle according to claim 1, wherein the second battery is configured to be charged by the IGN power source.

8. A method of controlling a vehicle, the vehicle including a first battery, a power distribution device configured to provide an IGN power source and a BAT power source from the first battery, a second battery, and an airbag, the method comprising:
receiving power from at least one of the IGN power source of the power distribution device, the BAT power source of the power distribution device, or the second battery;
receiving power from the second battery based on a voltage of the IGN power source and a voltage of the BAT power source; and
receiving power from an emergency capacitor based on a voltage of the second battery,
wherein the receiving power from an emergency capacitor comprises
receiving the power from the emergency capacitor when the voltage of the second battery is less than a predetermined reference voltage.

9. The method according to claim 8, wherein the receiving power from the second battery comprises
receiving power from the second battery when both the voltage of the IGN power source and the voltage of the BAT power source are less than the predetermined reference voltage.

10. An airbag control device provided in a vehicle including a first battery, a power distribution device configured to provide an IGN power source and a BAT power source from the first battery, a second battery, and an airbag, the airbag control device comprising:
a power circuit configured to receive power from at least one of the IGN power source of the power distribution device, the BAT power source of the power distribution device, or the second battery; and
a controller configured to configured to receive power from the IGN power source to deploy the airbag, and to receive power from the second battery based on a voltage of the IGN power source and a voltage of the BAT power source,
wherein the airbag control device further comprises an emergency capacitor connected to the controller, and the controller is configured to receive power from the emergency capacitor based on a voltage of the second battery, and
wherein the controller receives the power from the emergency capacitor when the voltage of the second battery is less than a predetermined reference voltage.

11. The airbag control device according to claim 10, wherein the controller is further configured to receive power from the second battery when both the voltage of the IGN power source and the voltage of the BAT power source are less than the predetermined reference voltage.

12. The airbag control device according to claim 11, wherein:
the airbag control device further comprises a first switch arranged between the second battery and the power circuit, and
the controller is further configured to turn on the first switch to receive power from the second battery.

13. The airbag control device according to claim 12, wherein:
the airbag control device further comprises a second switch arranged between the emergency capacitor and the controller, and
the controller is further configured to turn on the second switch to receive power from the emergency capacitor.

* * * * *